United States Patent
Huang et al.

(10) Patent No.: US 10,801,855 B2
(45) Date of Patent: Oct. 13, 2020

(54) METHOD AND SYSTEM FOR CREATING MAP BASED ON 3D LASER

(71) Applicant: Zhejiang Guozi Robot Technology Co., Ltd., Hangzhou, Zhejiang Province (CN)

(72) Inventors: Hong Huang, Hangzhou (CN); Yikun Tao, Hangzhou (CN); Jie Liu, Hangzhou (CN); Lvjun Jin, Hangzhou (CN)

(73) Assignee: Zhejiang Guozi Technology Co., Ltd., Hangzhou, Zhejiang (CN)

( * ) Notice: Subject to any disclaimer, the term of this patent is extended or adjusted under 35 U.S.C. 154(b) by 281 days.

(21) Appl. No.: 15/745,573

(22) PCT Filed: Jan. 12, 2018

(86) PCT No.: PCT/CN2018/072482
§ 371 (c)(1),
(2) Date: Jan. 17, 2018

(87) PCT Pub. No.: WO2019/136714
PCT Pub. Date: Jul. 18, 2019

(65) Prior Publication Data
US 2020/0080860 A1  Mar. 12, 2020

(51) Int. Cl.
*G01C 21/36* (2006.01)
*G01S 17/89* (2020.01)
(Continued)

(52) U.S. Cl.
CPC .......... *G01C 21/367* (2013.01); *G01S 17/89* (2013.01); *G06T 17/00* (2013.01); *G09B 29/003* (2013.01)

(58) Field of Classification Search
CPC .... G01C 21/367; G09B 29/003; G06T 17/00; G01S 17/89
See application file for complete search history.

(56) References Cited

U.S. PATENT DOCUMENTS

2018/0307941 A1* 10/2018 Holz .............. G05D 1/024

FOREIGN PATENT DOCUMENTS

| CN | 104914865 A | 9/2015 |
|---|---|---|
| CN | 104964683 A | 10/2015 |

(Continued)

*Primary Examiner* — Rodney A Butler
(74) *Attorney, Agent, or Firm* — Andrus Intellectual Property Law, LLP (57) ABSTRACT

A method for creating a map based on 3D laser that includes: planning a route, and acquiring data in a movement process of a mobile robot; loading acquired data by using a map creating tool; performing initial alignment to adjacent laser data; performing accurate alignment to the adjacent laser data; performing closed-loop association to the same area passed through by the mobile robot, and establishing a closed-loop constraint; performing global optimization solution to an entire map for which the closed-loop constraint is established; and superposing all laser data, and outputting a laser map. The method does not depend on GPS and is not restricted by GPS signals. By using the method, cumbersome surveying and mapping operations can be avoided and large-scale maps of various indoor and outdoor environments can be created and maps can be finely adjusted off line, and high-accuracy maps can be created.

12 Claims, 4 Drawing Sheets

(51) Int. Cl.
*G06T 17/00* (2006.01)
*G09B 29/00* (2006.01)

(56) References Cited

FOREIGN PATENT DOCUMENTS

| | | | | |
|---|---|---|---|---|
| CN | 105702151 | A | | 6/2016 |
| CN | 106153048 | A | | 11/2016 |
| CN | 106767827 | A | * | 5/2017 |
| CN | 109900269 | A | * | 6/2019 |
| WO | 2016162568 | A1 | | 10/2016 |

* cited by examiner

METHOD AND SYSTEM FOR CREATING MAP BASED ON 3D LASER

CROSS-REFERENCE TO RELATED APPLICATIONS

This application claims priority to PCT/CN2018/072482, filed Jan. 12, 2018.

FIELD OF THE INVENTION

The present invention relates to creating a 3D map for an environment, in particular to a method and a system for creating a 3D map for a working scenario of a mobile robot.

DESCRIPTION OF THE PRIOR ART

In the field of numerous intelligent control or intelligent devices for navigation, simulation, robots, virtual/augmented reality and the like, further development or use is performed always based on two-dimensional or three-dimensional electronic maps. Therefore, creating a map for a real environment, and rapidly, effectively and accurately converting the real environment into a two-dimensional or three-dimensional electronic map are fundamental technologies widely applied to fields of intelligent control or intelligent devices. In the field of mobile robots, good electronic maps are premises and bases for robots to realize autonomous movement.

For a mobile robot, autonomous walking is the most important capability and is also a problem which is the most difficult to solve. In order to realize autonomous walking of the mobile robot, usually the following four problems need to be solved: 1) map creation: sensing and measuring a profile of an operating environment, and recreating a 2D or 3D structure of the environment, i.e., creating a 2D or 3D map of the environment; 2) positioning computation: computing a position of the robot in the map based on the created map and the current observation data of the robot; 3) route planning: planning a walking route according to the current position and the target position of the robot; and 4) track control: controlling the robot to accurately walk along the route according to the route to walk of the mobile robot and the deviation of the robot from the target route.

From the above-mentioned description, it can be seen that the positioning computation, route planning and track control of the mobile robot are inseparable from the map creation, and only can be realized based on the map creation. Therefore, high-efficiency and high-quality 3D map creation has a very important significance.

3D map creation mainly includes vision-based 3D map creation and 3D laser-based 3D map creation. The vision-based 3D map creation usually has the disadvantages that the long distance accuracy is low, the creation is easily interfered by illumination and movement and the like. Because of advantages of high ranging accuracy, strong anti-interference capability and the like, 3D laser is a comparatively ideal sensor for 3D map creation at present.

In the existing 3D laser map creating methods, some methods cooperate with differential GPS to solve the problem of error accumulation, but the map creating methods depending on differential GPS cannot solve the problem of map creation of environments with poor GPS signals; some methods utilize surveying and mapping devices such as total stations to solve the problem of distortion and deformation of maps, but they need to cooperate with additional total stations and the mapping process is complex to operate; and some methods utilize an automatic closed-loop detection algorithm to decrease error accumulation, but requirements on structured features of environments are comparatively high, map quality is usually not good in scenarios of bad structured environments and it is comparatively difficult to create large maps.

SUMMARY OF THE INVENTION

In view of the above-mentioned defects in the prior art, by combining a milemeter, inertial navigation and a 3D laser sensor on a mobile robot and performing track recursion by using the milemeter and the inertial navigation to provide an initial value for alignment of laser, the present invention accelerates the speed of laser alignment and can effectively avoid failure of alignment in case of poor laser data. The present invention can also perform accurate loop closing to any environment walked through by the mobile robot in an automatic or manual loop closing manner, can adapt to outdoor poorly structured scenarios and can create large-size maps of various indoor and outdoor environments. At the same time, by separating map data acquisition from map creation, the present invention can repetitively make fine adjustment to maps off line and can create high-accuracy varied-scale 3D maps. In addition, the present invention does not depend on GPS and total stations, thus the operation is simple and convenient to perform and the efficiency is high.

In one aspect, the present invention provides a method for creating a map based on 3D laser, comprising the following steps: S1: planning a route and acquiring data in a movement process of a mobile robot; S2: loading acquired data by using a map creating tool; S3: performing initial alignment to adjacent laser data; S4: performing accurate alignment to adjacent laser data; S5: performing closed-loop association to the same area passed through by the mobile robot and establishing a closed-loop constraint; S6: performing global optimization solution to an entire map for which the closed-loop constraint is established; and S7: superposing all laser data and outputting a laser map.

In one embodiment of the present invention, step S1 comprises: planning the route according to one or more of the following rules: (i) firstly walking along a large closed-loop route and then walking along internal small closed-loop routes; (ii) avoiding walking back and forth on the same route as much as possible; and (iii) closing closeable routes as much as possible.

In another embodiment of the present invention, step S1 comprises: acquiring mileage data, inertial navigation data and laser data in a walking process of the mobile robot.

In another embodiment of the present invention, step S1 comprises: recurring a walking track of the mobile robot by combining the mileage data and the inertial navigation data, then continuously determining the walking of the mobile robot, and saving a frame of laser data every certain distance of walking or certain angle of rotation.

In another embodiment of the present invention, step S3 comprises: performing track recursion computation to the walking track of the mobile robot by using the mileage data and the inertial navigation data, and then superposing each frame of laser data saved in the walking process according to positions obtained through track recursion to complete initial alignment of laser data.

In another embodiment of the present invention, step S4 comprises: using an initial assignment result obtained in step S3 as an initial value of alignment of two adjacent frames of laser data and performing accurate alignment to the two adjacent frames of laser by using normal distribution transform.

In another embodiment of the present invention, step S4 comprises: updating the walking track of the mobile robot by using a pose obtained through accurate alignment.

In another embodiment of the present invention, step S5 comprises: traversing the laser data in the walking process of the mobile robot and associating data of the same area passed through by the mobile robot.

In another embodiment of the present invention, step S5 comprises: S5.1: selecting laser data to which closed-loop association can be performed and moving the laser data to relative poses which are capable of being aligned to obtain an initial matching value; and S5.2: performing accurate alignment based on the obtained initial matching value through normal distribution transform to obtain accurate relative poses of two frames of closed-loop laser data.

In another embodiment of the present invention, step S5 comprises: performing closed-loop association in an automatic and/or manual manner.

In another embodiment of the present invention, step S6 comprises: solving an optimal global pose of each frame of laser data acquired by the mobile robot from the angle of probability according to a matching relation between adjacent frames of laser data and a matching relation of laser data established by means of loop closing.

In another embodiment of the present invention, step S7 comprises: superposing the laser data with the global pose and transforming all laser data into a unified coordinate system to obtain laser data of the unified coordinate system.

In another aspect, the present invention provides a system for creating a map based on 3D laser, comprising:
a route planning module configured to manually plan a walking route of a mobile robot aiming at an actual scenario for which a map needs to be created;
a data acquisition module comprising: the mobile robot configured to be capable of moving or walking according to preset instructions or in a real-time control manner; sensors comprising a milemeter, inertial navigation and a 3D laser; and a data acquisition device loaded on the mobile robot and configured to be capable of acquiring various sensor data in a walking process of the mobile robot;
a map creating module comprising: a data loading module configured to be capable of loading the acquired various data; an initial alignment module configured to be capable of performing initial alignment to laser data by using the loaded data to obtain an initial value; an accurate alignment module configured to be capable of further performing accurate alignment to the laser data based on the initial value; a closed-loop association module configured to be capable of performing closed-loop association to the same area passed through by the mobile robot and establishing a closed-loop constraint; and a global optimization module configured to be capable of performing global optimization solution to an entire map for which the closed-loop constraint is established; and
a map outputting module configured to be capable of outputting a laser map based on a processing result of the map creating module.

In one embodiment of the present invention, the route planning module is configured to manually plan the route according to one or more of the following rules: (i) firstly walking along a large closed-loop route and then walking along internal small closed-loop routes; (ii) avoiding walking back and forth on the same route as much as possible; and (iii) closing closeable routes as much as possible.

In another embodiment of the present invention, the data acquisition module is configured to be capable of acquiring mileage data, inertial navigation data and laser data in the walking process of the mobile robot.

In another embodiment of the present invention, the data acquisition module is configured to be capable of recurring a walking track of the mobile robot by combining the mileage data and the inertial navigation data, continuously determining the walking of the mobile robot, and saving a frame of the laser data every certain distance of walking or certain angle of rotation.

In another embodiment of the present invention, the initial alignment module is configured to be capable of performing track recursion computation to the walking track of the mobile robot by using the mileage data and the inertial navigation data, and then superposing each frame of laser data saved in the walking process according to positions obtained through track recursion.

In another embodiment of the present invention, the accurate alignment module is configured to be capable of using an initial assignment result as an initial value of alignment of two adjacent frames of laser data and performing accurate alignment to two adjacent frames of laser by using normal distribution transform.

In another embodiment of the present invention, the accurate alignment module is configured to be capable of updating the walking track of the mobile robot by using a pose obtained through accurate alignment.

In another embodiment of the present invention, the closed-loop association module is configured to be capable of traversing the laser data in the walking process of the mobile robot and associating data of the same area passed through by the mobile robot.

In another embodiment of the present invention, the closed-loop association module is configured to be capable of selecting laser data to which closed-loop association can be performed and moving the laser data to relative poses which are capable of being aligned to obtain an initial matching value, and be capable of performing accurate alignment based on the obtained initial matching value through normal distribution transform to obtain accurate relative poses of two frames of closed-loop laser data.

In another embodiment of the present invention, the closed-loop association module is configured to be capable of performing closed-loop association in an automatic and/or manual manner.

In another embodiment of the present invention, the global optimization module is configured to be capable of solving an optimal global pose of each frame of laser data acquired by the mobile robot from the angle of probability according to a matching relation between adjacent frames of laser data and a matching relation of laser data established by means of loop closing.

In another embodiment of the present invention, the map outputting module is configured to be capable of superposing the laser data with the global pose and transforming all laser data into a unified coordinate system to obtain laser data of the unified coordinate system.

The above-mentioned method and system provided by the present invention do not depend on GPS and are not restricted by GPS signals; no surveying and mapping device such as a total station is used and cumbersome surveying and mapping operations are avoided; a manual loop closing method can be used and large-scale maps of various indoor and outdoor environments can be created; and data acquisition can be separated from map creation, maps can be finely adjusted off line and high-accuracy maps can be created.

The concept, the specific structure and the produced technical effects of the present invention will be further described below with reference to the drawings, so as to fully understand the purposes, features and effects of the present invention.

DETAILED DESCRIPTION OF THE PREFERRED EMBODIMENTS

A plurality of preferred embodiments of the present invention will be described below with reference to the drawings, so as to enable the technical content thereof to be clearer and easier to understand. The present invention may be implemented through various different forms of embodiments, and the protective scope of the present invention is not limited to only the embodiments mentioned herein.

In the description below, a lot of specific details are given to provide a more thorough understanding of the present application. However, it is obvious to one skilled in the art that the present application can be implemented without one or more of these details. It shall be understood that the present application can be implemented in different forms and it shall not be understood that the present invention is limited to the embodiments provided herein. Contrarily, by providing these embodiments, the technical content of the present application will be clearer and easier to understand.

A high-accuracy 3D map is very important to a mobile robot, and it is a prior condition for autonomous walking of the mobile robot and is also a premise for the mobile robot to accurately go to a point to execute a task. Therefore, researches on reliable, high-efficiency and high-quality methods for creating 3D maps have a very important significance.

The technical solutions of the present invention will be described below in detail in combination with the specific embodiments of the present invention.

Figure 1:
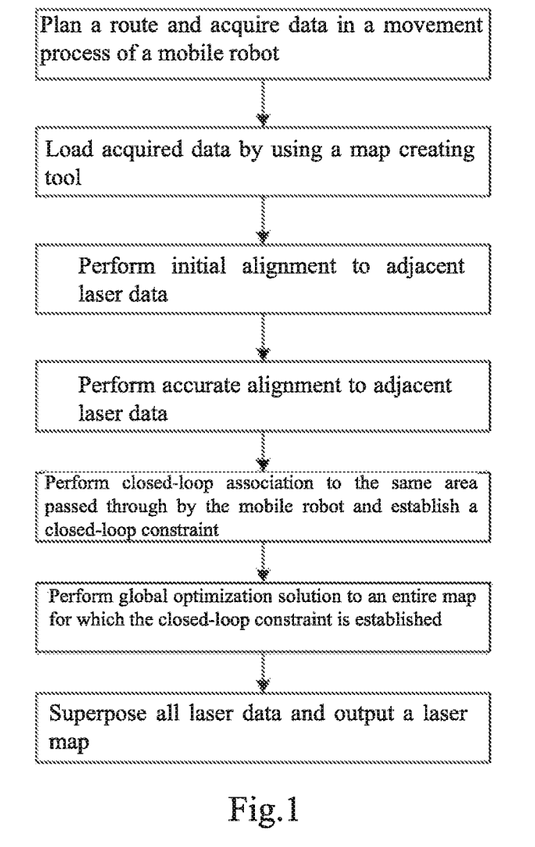
FIG. 1 is a flowchart of steps in a method for creating a map in one embodiment of the present invention.

The present invention provides a method and a system for creating a 3D map based on 3D laser. FIG. 1 illustrates a flowchart of steps in a method for creating a map in one embodiment of the present invention, and a process thereof mainly comprises the following steps:
(1) planning a route and acquiring data in a movement process of a mobile robot;
(2) loading acquired data by using a map creating tool;
(3) performing initial alignment to adjacent laser data;
(4) performing accurate alignment to the adjacent laser data;
(5) performing closed-loop association to the same area passed through by the mobile robot and establishing a closed-loop constraint;
(6) performing global optimization solution to an entire map for which the closed-loop constraint is established; and
(7) superposing all laser data and outputting a laser map.

In the step of planning a route and acquiring data, according to an operation scenario of the mobile robot, a reasonable data acquisition route is planned and a data acquisition device is used to acquire various relevant data or information in the movement process of the robot. In one embodiment of the present invention, planning and acquisition may be performed according to the following basic rules:
(i) firstly walking along a large closed-loop route and then walking along internal small closed-loop routes;
(ii) avoiding walking back and forth on the same route as much as possible; and
(iii) closing closeable routes as much as possible.

Based on the above-mentioned rules, on one hand, routes can be simplified as much as possible to decrease the total length of routes walked along by the robot, so as to decrease the volume of data required to be acquired and accelerate the overall acquisition speed of data; and on the other hand, closed routes can be formed as many as possible to facilitate subsequent processing and improve creation efficiency.

After the route planning is completed, the data acquisition device loaded on the mobile robot can be enabled, and the robot is controlled to run or move along a planned route, and simultaneously, various data or information such as mileage data, inertial navigation data and 3D laser data in the walking process of the robot are acquired. Herein, since the volume of the laser data is large, preferably the laser data are screened and saved according to certain conditions. In one embodiment of the present invention, a specific manner is to recur a walking track of the mobile robot by combining the mileage data and the inertial navigation data, then continuously determine the walking of the mobile robot, and save a frame of laser data every certain distance of walking or certain angle of rotation (such as 1 m or 30°).

Figure 2:
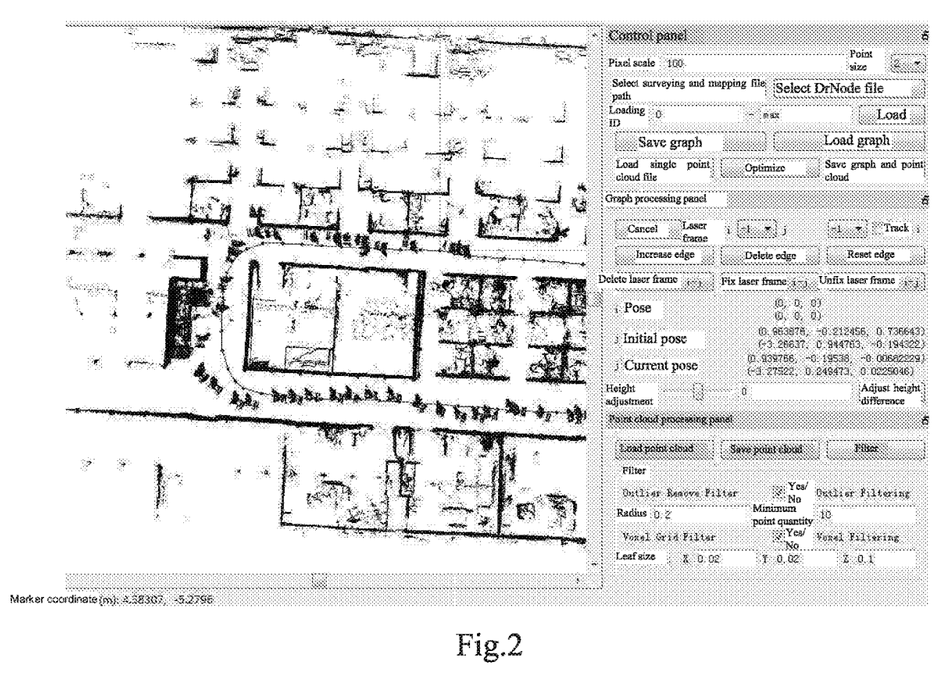
FIG. 2 is a schematic diagram of a map creating tool in one embodiment of the present invention.

Then, the acquired data are imported into a map creating tool through a data loading tool. FIG. 2 illustrates a schematic diagram of a map creating tool in one embodiment of the present invention. Herein, various acquired data can be imported to perform various corresponding operations and set or adjust various corresponding parameters. In one embodiment of the present invention, one or more of the following parameters may be set or adjusted when data are loaded: a pixel scale, a point size, a loading ID and range, a laser frame pose, whether to track, a height difference, a radius, a minimum point quantity, a leaf size, coordinates and the like; and one or more of the following operations may also be performed: selecting a surveying and mapping file path, selecting a DrNode file, loading, saving a graph, loading a graph, loading a single point cloud file, optimizing, saving a graph and a point cloud, canceling, increasing an edge, deleting an edge, resetting an edge, deleting a laser frame, fixing a laser frame, unfixing a laser frame, adjusting a height difference, loading a point cloud, saving a point cloud, filtering and the like. In addition, the map creating tool may also intuitively display the map in the processing process and dynamically update and present it according to different operations, so as to facilitate adjustment and processing performed to map data.

The acquired data are loaded into the map creating tool to process the map data to create a map. By separating map data acquisition from map creation, fine adjustment can be repetitively made to the map off line and high-accuracy varied-scale 3D maps can be created.

Initial alignment is performed to laser data. In one embodiment of the present invention, during loading, track recursion computation may be performed to the walking track of the mobile robot by using the mileage data and the inertial navigation data, and then each frame of laser data saved in the walking process is superposed according to positions obtained through track recursion to complete initial alignment of laser data. Herein, a principle of track recursion is as follows:

Supposing that the moving angular speed of the robot measured by the inertial navigation sensor is $\omega=[\omega_x\ \omega_y\ \omega_z]^T$ and a posture matrix of the robot is R, the following formula is obtained:

$$R = S(\omega)R,$$
$$\text{where } S(\omega) = \begin{bmatrix} 0 & -\omega_z & \omega_y \\ \omega_z & 0 & -\omega_x \\ -\omega_y & \omega_x & 0 \end{bmatrix}.$$

Supposing that the moving speed of the robot obtained by the mileage sensor is v and the position of the robot is $P=[x\ y\ z]^T$, the following formula is obtained:

$$P = R\begin{bmatrix} v \\ 0 \\ 0 \end{bmatrix}$$

Accurate alignment is performed to adjacent laser data. Most of matching algorithms of a point cloud depend on a better initial value. Especially for a poorly structured scenario, an alignment result of laser frames easily falls into a situation of local optimization and consequently an overall output result is influenced. In one embodiment of the present invention, an initial pose may be provided for each frame of laser data through track recursion, and this initial pose is used as an initial value for alignment of two adjacent frames of laser data and then accurate alignment is performed to the two adjacent frames of laser by using NDT (Normal Distribution Transform), such that not only can the alignment speed be improved, but also the situation that the alignment falls into the situation of local optimization can be avoided, and a failure of alignment in case of poor laser data can be effectively avoided. After alignment of all adjacent frames of laser data, the walking track of the robot may be updated by using the pose obtained through accurate alignment.

Closed-loop association is performed to the same area passed through by the mobile robot and a closed-loop constraint is established. That is, the robot walks through the same place for many times, the laser scans the same structures at each time of walking, the same structures are associated to obtain relative poses of closed-loop laser frame data after association.

For a well structured environment, automatic closed-loop association may be performed by using a closed-loop association algorithm. However, the following certain uncertainties may exist: the first uncertainty is that similar areas often exist in the environment, and similar areas may be easily detected as a closed loop since features are relatively few for the laser data; the second uncertainty is that, for a poorly structured area, laser data do not have stable features which can be extracted to perform closed loop computation; and the third uncertainty is that laser poses always have certain errors, such that laser data of the same place may be relatively far in the computed track, and consequently the failure rate of closed-loop association may be relatively high. Since places which are similar areas and places which are actually repeated walked-through areas and can be closed as a loop can be more easily distinguished through manual loop closing, in one embodiment of the present invention, a manual loop closing operation manner may be selected or a manual loop closing operation manner may be added based on automatic loop closing.

In one embodiment of the present invention, a specific method for closed-loop association is to traverse laser data in the walking process of the robot, observe data of repetitively walked-through places and associate these data. Herein, the method comprises the following two steps:

(1) selecting laser data to which closed-loop association can be performed and moving the laser data to relative poses which are almost capable of being aligned to obtain an initial matching value; and (2) performing accurate alignment based on the obtained initial matching value through NDT to obtain accurate relative poses of two frames of closed-loop laser data after alignment.

Relative to the limitation of automatic loop closing, a manual loop closing manner can perform more accurate loop closing to any environment walked through by the mobile robot, can adapt to outdoor poorly structured scenarios and can create large-size maps of various indoor and outdoor environments.

All above-mentioned steps belong to matching of laser data, and the matching includes alignment of two adjacent frames of laser data and closed-loop matching of data of the same place. On this basis, global optimization solution may be performed to an entire map for which the closed-loop constraint is established by using graph optimization. In one embodiment of the present invention, global optimization solution is performed to the walking track of the robot after matching, and an optimal global pose of each frame of laser data acquired by the mobile robot is solved from the angle of probability by simultaneously considering a matching relation between adjacent frames of laser data and a matching relation of laser data established by means of loop closing. In one embodiment of the present invention, global solution may be performed by using g2o (general graph optimization).

Figure 3:
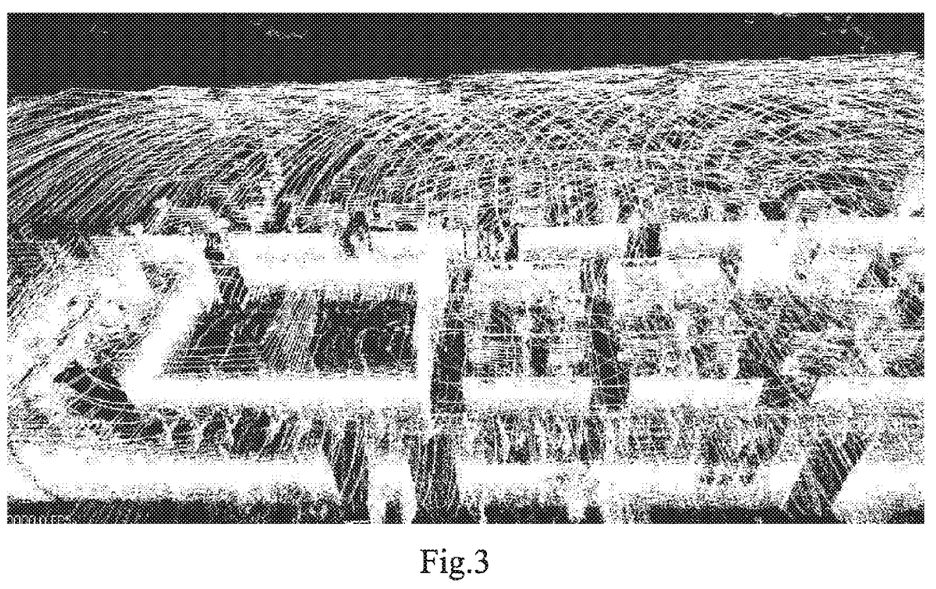
FIG. 3 is a schematic diagram of a 3D laser map in one embodiment of the present invention.

Finally a 3D laser map is output. Since coordinates of each frame of laser data are coordinates of a coordinate system relative to a laser device at that moment, all laser data may be unified into the same coordinate system to obtain an overall 3D laser map. In one embodiment of the present invention, after the optimal global pose of each frame of laser data is solved, the laser data can be superposed with the global pose of the laser, and all laser data are transformed into a certain unified coordinate system (such as a coordinate system of a first frame of laser) to obtain 3D laser data of the unified coordinate system. These data form the final 3D laser map. FIG. 3 illustrates a schematic diagram of a 3D laser map in one embodiment of the present invention.

Based on the above-mentioned method and operations, the present invention further provides a system for creating a map based on 3D laser, which mainly comprises a route planning module, a data acquisition module, a map creating module and a map outputting module.

Herein, the route planning module is capable of planning a walking route of a mobile robot aiming at an actual area for which a map needs to be created. In different embodiments, route planning may be performed through an automatic route planning algorithm, a route planning aid tool may also be used to perform route planning in a manual manner or combined automatic and manual manners.

The data acquisition module mainly comprises: the mobile robot capable of moving or walking according to preset instructions or in a real-time control manner; sensors comprising a mileage sensor, an inertial navigation sensor and a 3D laser sensor; and a data acquisition device loaded on the mobile robot and capable of acquiring various data such as inertial navigation data, mileage data and laser data in a walking process of the mobile robot. In different embodiments, an integrated data acquisition device may be used for simultaneously acquiring various data, and different data acquisition devices may also be used for respectively acquiring various data.

The map creating module mainly comprises: a data loading module capable of loading the acquired various data; an initial alignment module capable of performing initial alignment to laser data by using the loaded data to obtain a better initial value; an accurate alignment module capable of further performing accurate alignment to the laser data based on the initial value; a closed-loop association module capable of performing closed-loop association to the same area passed through by the mobile robot and establishing a closed-loop constraint; and a global optimization module capable of performing global optimization solution to an entire map for which the closed-loop constraint is established.

The map outputting module is capable of superposing the laser data with the global pose of the laser after the optimal global pose of each frame of laser data is solved, and transforming all laser data into a unified coordinate system to obtain 3D laser data of the unified coordinate system.

Figure 4:
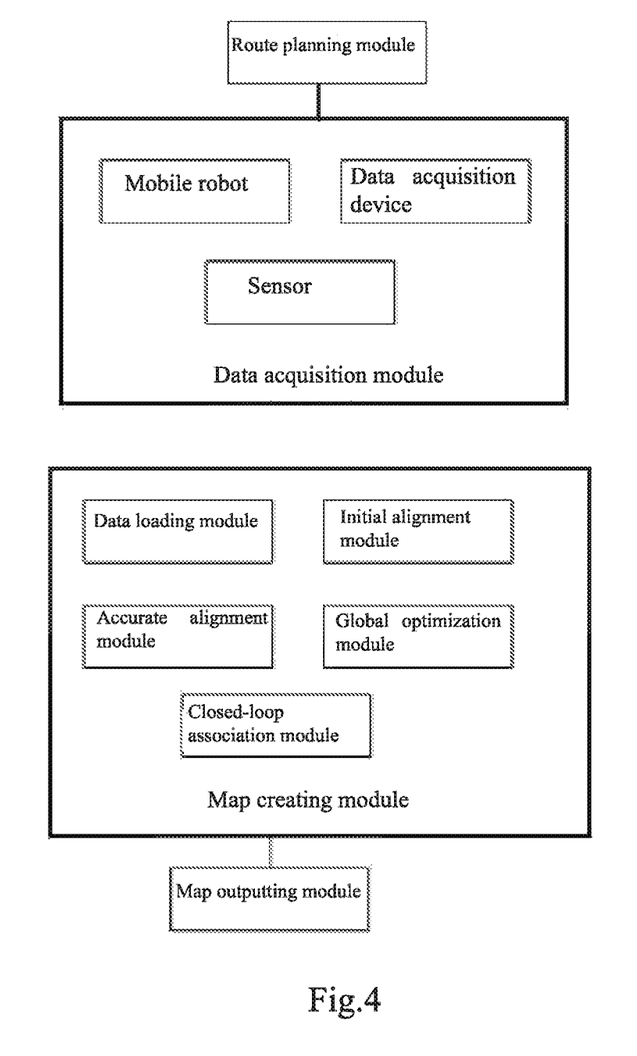
FIG. 4 is a schematic diagram of modules of a map creating system in one embodiment of the present invention.

FIG. 4 illustrates a schematic diagram of modules of a map creating system in one embodiment of the present invention. Each device and module in the map creating system may be implemented by means of hardware, software or a combination of software and hardware. The method and system provided by the present invention do not depend on GPS and are not restricted by GPS signals; and no surveying and mapping device such as a total station need to be used, cumbersome surveying and mapping operations are avoided and thus the operation is simple and convenient to perform, and the efficiency is high.

The preferred embodiments of the present invention have already been described above in detail. It shall be understood that one skilled in the art may make various modifications and variations to the concept of the present invention without inventive skills. Therefore, any technical solution obtained by one skilled in the art through logical analysis, reasoning or limited experiments according to the concept of the present invention on the basis of the prior art shall be all included in the protective scope determined by the claims.

The invention claimed is:

1. A method for creating a map based on 3D laser, wherein the method comprises the following steps:
    S1: planning a route, and acquiring data in a movement process of a mobile robot;
    S2: loading acquired data by using a map creating tool;
    S3: performing initial alignment to adjacent laser data;
    S4: performing accurate alignment to the adjacent laser data;
    S5: performing closed-loop association to the same area passed through by the mobile robot, and establishing a closed-loop constraint;
    S6: performing global optimization solution to an entire map for which the closed-loop constraint is established; and
    S7: superposing all laser data and outputting a laser map.

2. The method for creating a map according to claim 1, wherein step S1 comprises:
    planning the route according to one or more of the following rules: (i) firstly walking along a large closed-loop route and then walking along internal small closed-loop routes; (ii) avoiding walking back and forth on the same route as much as possible; and (iii) closing closeable routes as much as possible.

3. The method for creating a map according to claim 1, wherein step S1 comprises:
    acquiring mileage data, inertial navigation data and laser data in a walking process of the mobile robot.

4. The method for creating a map according to claim 3, wherein step S1 comprises:
    recurring a walking track of the mobile robot by combining the mileage data and the inertial navigation data, then continuously determining the walking of the mobile robot and saving a frame of laser data every certain distance of walking or certain angle of rotation.

5. The method for creating a map according to claim 1, wherein step S3 comprises:
    performing track recursion computation to the walking track of the mobile robot by using the mileage data and the inertial navigation data, and then superposing each frame of laser data saved in the walking process according to positions obtained through track recursion to complete initial alignment of laser data.

6. The method for creating a map according to claim 1, wherein step S4 comprises:
    using an initial assignment result obtained in step S3 as an initial value of alignment of two adjacent frames of laser data, and performing accurate alignment to the two adjacent frames of laser by using normal distribution transform.

7. The method for creating a map according to claim 1, wherein step S4 comprises:
    updating the walking track of the mobile robot by using a pose obtained through accurate alignment.

8. The method for creating a map according to claim 1, wherein step S5 comprises:
    traversing the laser data in the walking process of the mobile robot, and associating data of the same area passed through by the mobile robot.

9. The method for creating a map according to claim 8, wherein step S5 comprises:
    S5.1: selecting laser data to which closed-loop association can be performed, and moving the laser data to relative poses which are capable of being aligned to obtain an initial matching value; and
    S5.2: performing accurate alignment based on the obtained initial matching value through normal distribution transform to obtain accurate relative poses of two frames of closed-loop laser data.

10. The method for creating a map according to claim 1, wherein step S5 comprises:
    performing closed-loop association in an automatic and/or manual manner.

11. The method for creating a map according to claim 1, wherein step S6 comprises:
    solving an optimal global pose of each frame of laser data acquired by the mobile robot from the angle of probability according to a matching relation between adjacent frames of laser data and a matching relation of laser data established by means of loop closing.

12. The method for creating a map according to claim 1, wherein step S7 comprises:

superposing the laser data with the global pose, and transforming all laser data into a unified coordinate system to obtain laser data of the unified coordinate system.

\* \* \* \* \*